TIME RECORDER FOR PLURAL EVENTS REGISTRATION

Filed Aug. 14, 1950 2 Sheets-Sheet 1

Inventor

LEWIS W IMM &
WILLARD J. OPOCENSKY
By Naylor and Lassagne
Attorneys

July 20, 1954 W. J. OPOCENSKY ET AL 2,684,280

TIME RECORDER FOR PLURAL EVENTS REGISTRATION

Filed Aug. 14, 1950 2 Sheets-Sheet 2

LEWIS W. IMM & WILLARD J. OPOCENSKY Inventor

By Naylor and Lassagne Attorneys

Patented July 20, 1954

2,684,280

UNITED STATES PATENT OFFICE 2,684,280

TIME RECORDER FOR PLURAL EVENTS REGISTRATION

Willard John Opocensky, Glendale, and Lewis William Imm, Los Angeles, Calif., assignors to Librascope, Incorporated, Glendale, Calif., a corporation of California Application August 14, 1950, Serial No. 179,356

3 Claims. (Cl. 346—123)

The present invention relates to recording devices of the type employing a stylus to inscribe a line on a record card or disk which is moved relatively to the stylus.

The subject matter of this application relates to a species of the invention disclosed and claimed in Imm application Serial No. 101,315 filed June 25th, 1949, and the primary object of the invention herein disclosed is to provide a recorder operable to record events over an extended period of time and acting through novel and simple stylus actuating means. The said means comprises a simple cam actuated system of pivotally related lever elements causing the stylus to produce a uniform spiral line and includes means for causing deviating movements of the stylus through supplemental force applied momentarily to the lever system. The means for causing the deviating movements of the stylus is made selective as to amplitude of such movements, thereby affording distinguishably different deviations for recording different sources or causes of the deviation impulses.

A preferred embodiment of the invention is hereinafter described and is illustrated in the accompanying drawings, where Figure 1 is a frontal elevation of the recorder mechanism;

Figure 1:
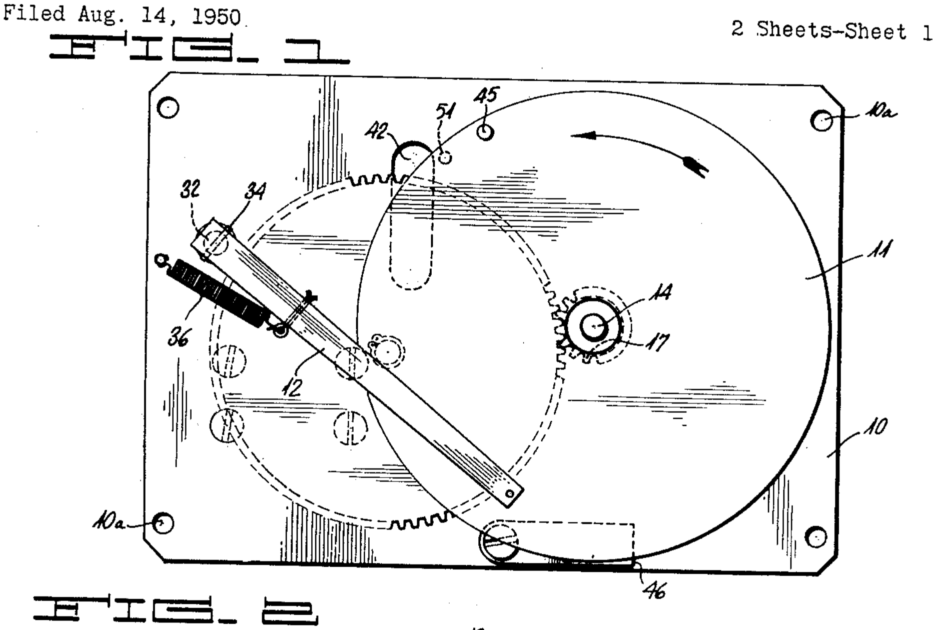

The illustrated embodiment of the invention comprises a base plate 10 supporting all the internal elements of the recorder. This base plate with the parts mounted thereon is adapted to be mounted within a suitable casing (not shown) and secured by fastening means in the corner holes 10a with the face of the chart plate 11 and the overlying portion of the stylus arm 12 exposed to view.

The rear face of base plate 10 carries a driving device enclosed in the housing 13 here shown as a synchronous motor of the kind commonly used to drive electric clocks. A drive shaft 14, driven through suitable reduction gears within the housing 13, as indicated at 15, Figure 3, has a bearing in the base plate beyond which it has keyed thereto a drive pinion 16. The free end of drive shaft 14 is screw threaded and adapted to receive the chart plate 11 which seats against the outer face of pinion 16 and is clamped thereagainst by a finger nut 17 on the protruding end of shaft 14.

The pinion 16 is in meshed relation with a large driven gear 18 which is journaled on the end of a stub shaft 19 fixed to the base plate. In the space between large gear 18 and the base plate the stub shaft 19 carries a spiral or snail cam 20 which rotates with gear 18 and is secured on a journal sleeve 21 fixed to gear 18.

Figure 3:
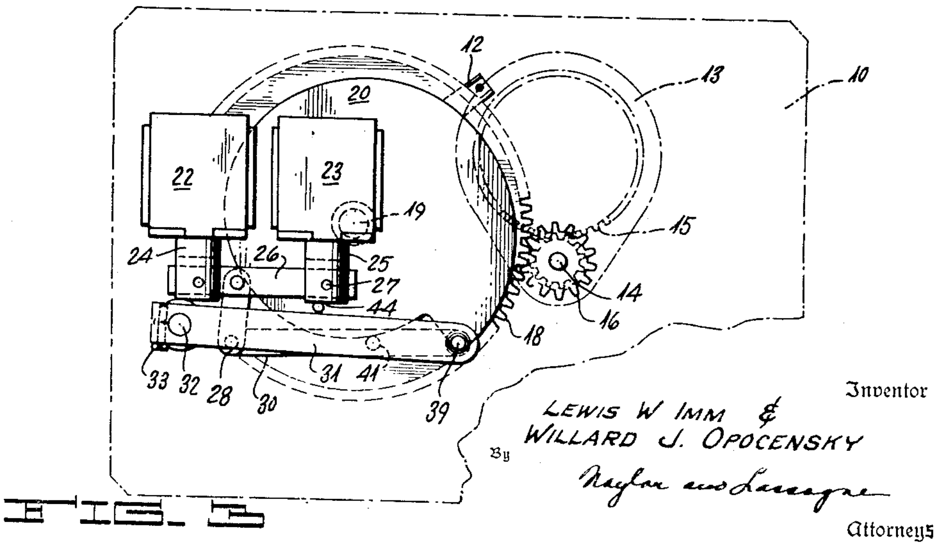
Figure 3 is a rear plan view as seen with Figure 2 tilted forward, the bed plate being shown only in phantom lines.
Figure 4:
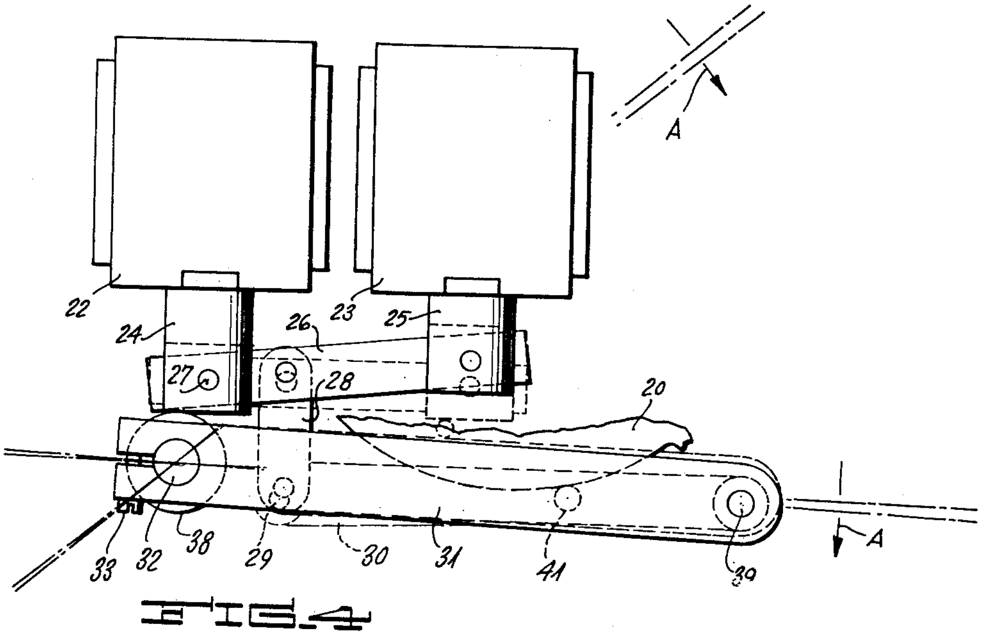
Figure 4 is an enlarged detail view of the lever linkage seen in Figure 3 including broken line showings to be explained.

The rear face of the base plate, opposite gear 18 and cam 20, has mounted thereon two suitably housed electromagnets 22, 23 in the form of solenoids the armatures 24, 25 of which extend upwardly beyond the coil housings in parallel relation to the base plate 10. The upper ends of the projecting armatures are forked or grooved to receive the ends of a first differential in the form of a connecting link 26 the ends of which are pivotally mounted within said grooves by pins 27 in the ends of the armatures. As best seen in Figures 3 and 4, the differential link 26 carries a short upstanding link 28 which is pivoted to it in off center relation, that is, adjacent the connection of link 26 with armature 24. The short link 28 has its upper end pivotally connected to a pintle 29 on the end of a second differential in the form of a lever arm 30 so as to constitute one input of said second differential. Lever arm 30 extends horizontally toward the center of the base plate and forms a middle or impelling arm which serves to impart motion to a bell-crank lever system. This system comprises a lever arm 31 spaced rearwardly from arm 30, a crank shaft 32 to the inner end of which shaft the arm 31 is fixed, as by the clamp screw 33 (Figure 4), and on the outer end of which the stylus arm 12 is mounted.

The stylus arm is preferably U-shaped in cross section and its mounted end straddles the end of shaft 32 and is connected thereto by a pivot pin 34 which secures the arm against rotation on shaft 32 but permits the arm to be swung up and down with respect to the chart plate 11 with which its free end is normally in contact through the stylus 35. A tension spring, such as coil spring 36 connected to the arm and base plate, normally serves to keep the stylus in contact with the chart. The crank shaft 32 is journaled in a bearing 37 fixed in the base plate and a spacing sleeve 38 between the base plate and arm 31 retains crank shaft 32 and its arms 31 and 12 in position.

The output of the differential lever 30 is transmitted by a pivotal connection between it and the crank arm 31 in the form of a cross-shaft 39 which may be fixed at one end to the end of arm 30 and journaled in arm 31 at its other end. At a predetermined intermediate point in its length, the differential lever 30 carries a laterally projecting cam engaging pintle 41 (Figure 2) which extends laterally through an aperture or slot 42 in the base plate and rides on the cam edge of snail cam 20 and constitutes the second input of the differential 30. A tension spring 43 anchored on the base plate and attached to sleeve 40 holds pintle 41 on the cam. Outward movement of the armature 25 is limited by a stop pin 44. The sleeve 38 serves the same purpose for armature 24.

It should be noted that the stylus arm 12 and its companion arm 31 extend from the crank shaft 32 at different angles. This brings the free end of the stylus arm near the periphery of chart plate 11 when pintle 41 is at the low point on the cam track, as on the drawings. Conversely, the stylus will be near the axis of the chart plate when the pintle is on the high point of the cam. Rotation of the chart plate is in a counterclockwise direction with reverse rotation of cam 20 through pinion 16 and gear 18. A stud 45 on the periphery of chart plate 11 serves to position a complementarily perforated or notched record card on the plate; the card being mounted thereon by removal of the finger nut 17 and replacement in clamping engagement with the center of the card. A friction member such as leaf spring 46 mounted on the base plate and lightly engaging the rear peripheral portion of the chart plate serves to prevent back lash and steady its rotation.

With the differential system of levers above described, it will be evident that any rocking movement imparted to the impelling or middle lever arm 30 will be transmitted to the bell-crank comprising crank shaft 32 with its opposite arms 31 and 12. Therefore, rotation of cam 20 will gradually swing the impelling arm 30 upward about its pivot at pintle 29 which may then act as the fulcrum for arm 30. This motion is transmitted through shaft 39 to lever arm 31 of the bell-crank and thus to stylus arm 12 moving it inward with respect to the record card through a range or arc of movement indicated by the arrows A on Figure 4. Operation of these parts as described will cause the stylus to describe an undeviating spiral line from its starting point adjacent the outer edge of the record card to its final point inwardly thereof. Events occurring at any points in the period represented by this spiral line are recorded by producing deviations from said line caused by supplemental movements imparted to the impelling arm 30 and therefore to the stylus through the lever system described.

Figure 5:
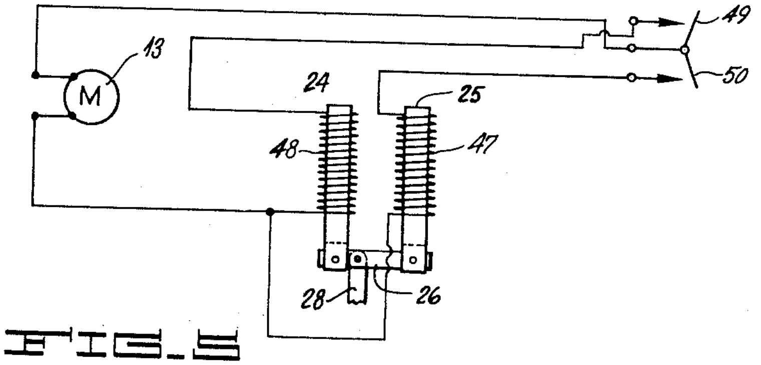
Figure 5 is a wiring diagram showing the electrical controls for actuating the recorder mechanism.

An important feature of the present invention is in the novel means provided for effecting a plurality of distinguishably different deviations for the purpose of recording different events or multiples of an identical event through variable supplemental movements imparted in the manner stated. For the purpose of effecting such deviations the link 26, pivotally connected at its ends to the armatures 24, 25, has its connection to differential arm 30, through link 28, situated at a point non-equidistant from its connections to the armatures, as heretofore described. As shown in Figure 5, the coils 47 and 48 within which said armatures move are connected into normally open control circuits in parallel with the motor 13, so that upon closure of either or both of these control circuits, as by switches 49, 50, either or both the armatures 24, 25 will be shifted inwardly to rock the link 26 on one or the other of its pivotal supports or translate it bodily toward the coils without rocking movement. A pull is thus exerted on link 28 and the inner end of differential arm 30 rocking it on cam engaging pintle 41 as a fulcrum and imparting corresponding movement to the lever system which includes the stylus arm 12, causing the stylus to deviate from the line normally traced by it and to trace a spiral line offset inwardly from the original spiral so long as solenoid energization is maintained. Upon deenergization, spring 43 will restore the lever system and stylus arm to normal position and the original spiral will be resumed.

The connections of the two solenoids 22, 23 to the system of levers above described is such that the energization of solenoid 23 alone will shift the pivotal connection of differential arm 30 at 29 a short distance as indicated, for example, by the full lines in Figure 4. Energization of solenoid 22 alone will shift the pivotal connection 29 a longer distance, as the link 26 will in each instance rock on its pivot in the armature of the opposite solenoid. Energization of both solenoids simultaneously will shift the pivot point 29 a still longer distance as both armatures draw link 26 bodily toward the solenoid coils. These movements of link 26 will, of course, be transmitted to stylus arm 12 and will produce three distinguishable deviations from the original spiral line being traced by stylus 35. Preferably, the maximum deviation capable of being imparted to stylus 35 is made to be less than the space between lines of the spiral being traced so that no overlapping of the traced line will occur.

Figure 2:
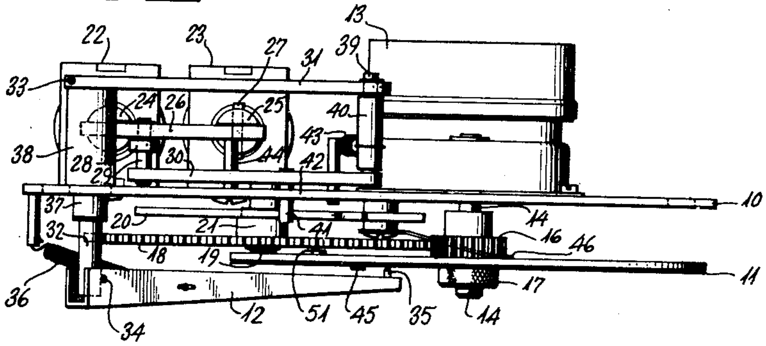
Figure 2 is a top view looking down on Figure 1.

It will be evident from the foregoing description that if, during operation of the recorder, either switch 49 or 50 is closed, or both are closed at once, a new spiral paralleling the original spiral record at one of three different spacings from the course of the original spiral, depending on the switch or switches used, will be traced as long as the particular switch control is effective. However, upon opening and release of the switch control, stylus arm 12 and stylus 35 will be abruptly returned to the original spiral path by action of spring 43 (Figure 2).

As will be evident, the stylus arm reaches its limit of inward movement on a chart carried by chart plate 11 when cam pintle 41 has reached the high point on snail cam 20. Continued rotation of the cam will cause pintle 41 to drop, through action of spring 43, to the low point on the cam track and thus return the stylus arm to its initial position. At about this time, it is contemplated that a fresh record card will be placed on the chart plate 11. This is done by unscrewing the nut 17, as above described, and lifting arm 12 on its pivot 34 while placing the card on plate 11 with a complemental perforation therein in engagement with the stud 45. Another stud 51 may be provided on the rear face of chart plate 11 to act as a stop, by contact with the end of spring 46, in the event of accidental reverse drive of the chart plate.

A recorder having the novel construction described will accordingly be capable of recording, in the specific form disclosed, three variations from the normal or static record line traced by the stylus. It accordingly provides an efficient and reliable instrument capable of registering, in a distinguishable manner, three extraneous impulses which may be indicative of origins, events, etc., occurring at certain intervals over an extended period of time. Many uses and adaptations of the invention embodied in the construction disclosed will be obvious to those familiar with the record art. Also, that certain variations from the specific construction and relation of parts herein described could be made without departure from the gist of the invention as claimed.

What is claimed is:

1. A recorder comprising a base plate, a motor driven record sheet holder rotatably mounted in the base plate over one face thereof, a spiral cam driven from the sheet holder in timed relation thereto, a bell-crank journaled in the base plate and comprising a stylus arm in cooperative relation to the sheet holder and a companion arm located over the other face of the base plate, an impelling lever pivoted at one end to the end of said companion arm and provided with a lateral extension in engagement with the spiral cam, a differential link pivotally connected at a non-equidistant point intermediate its ends to the other end of said impelling lever, supporting means pivotally connected to the opposite ends of said differential link, and means for selectively moving said supporting means either individually or in unison to impart rocking movements to said impelling lever about its lateral extension.

2. A recorder comprising a base plate, a motor driven record sheet holder rotatably mounted in said base plate, a spiral cam motor driven in timed relation to said record sheet holder, a bell-crank journaled in said base plate and comprising a stylus arm in cooperative relation to the sheet holder and a companion arm, an impelling lever pivoted at one end to the end of said companion arm and provided with a lateral extension in engagement with said spiral cam, and means comprising a movable member carried by said base plate for selectively constituting a fulcrum for said impelling lever during movement thereof by said cam or for rocking said impelling lever about a fulcrum constituted by the contact of said lateral extension with said cam.

3. A recorder having a base plate, a motor driven record sheet holder rotatably mounted on said base plate, a spiral cam rotatably mounted on said base plate and motor driven in timed relation to said record sheet holder, a cam follower engaging said spiral cam, a shaft rockably mounted on said base plate, a stylus arm fixed to said shaft and disposed in cooperative relation with said record sheet holder, and a movable actuating device for said stylus arm; characterized by the provision of differential mechanism for combining movements of said cam follower and said actuating device and rocking said stylus arm amounts proportional to such combined movements; said differential mechanism comprising a rockable arm fixed to said shaft, an element rockably mounted on said arm at a position spaced from the axis of said shaft, and separate operating connections between said cam follower and said element and said actuating device and said element; said operating connections being spaced from each other and from the said mounting of said element on said arm and each constituting a fulcrum about which said element may be rocked by movement imparted through the other to transmit proportionate movement to said arm.

References Cited in the file of this patent

UNITED STATES PATENTS

| Number | Name | Date |
|---|---|---|
| 981,989 | Fitch | Jan. 17, 1911 |
| 1,120,749 | Schurzmann | Dec. 15, 1914 |
| 1,322,148 | Sprague | Nov. 18, 1919 |
| 2,006,882 | Cleveland et al. | July 2, 1935 |

FOREIGN PATENTS

| Number | Country | Date |
|---|---|---|
| 633,830 | Germany | Aug. 7, 1936 |